United States Patent [19]

Chang

[11] Patent Number: 4,578,493

[45] Date of Patent: Mar. 25, 1986

[54] VINYL-HYDRO POLYSILOXANE COPOLYMERS RELEASE COMPOSITIONS

[75] Inventor: Mike S. H. Chang, Danbury, Conn.

[73] Assignee: Pitney Bowes Inc., Stamford, Conn.

[21] Appl. No.: 465,731

[22] Filed: Feb. 11, 1983

[51] Int. Cl.$^4$ .......................... C07F 7/08; C08F 2/46; C08F 2/50; C08F 30/08

[52] U.S. Cl. ..................... 556/451; 522/99; 522/43

[58] Field of Search ................ 556/451; 528/20, 31; 204/159.13 R

[56] References Cited

U.S. PATENT DOCUMENTS 3,046,293 7/1962 Pike .................................. 556/451 U
3,324,079 6/1967 Spalding ..................... 556/451 UX Primary Examiner—Paul F. Shaver
Attorney, Agent, or Firm—Melvin J. Scolnick; William D. Soltow, Jr.; Albert W. Scribner

[57] ABSTRACT

Novel radiation-curable, liquid vinyl-hydro copolymers and coating compositions which are free of volatile solvent(s) and which are adapted to be applied to a substrate and cured rapidly by exposure to radiation to form release coatings having good release properties with respect to adhesives and methods for producing such polymers and compositions and for applying and curing such release coatings are disclosed.

11 Claims, No Drawings

VINYL-HYDRO POLYSILOXANE COPOLYMERS RELEASE COMPOSITIONS

BACKGROUND OF THE INVENTION

Release coating compositions are well-known in the art and are used extensively to coat substrates such as paper to provide release surfaces to which adhesive elements, such as labels or tapes can be adhered and from which said adhesive elements can be peeled or separated without damage to the adhesive or to the release surface or to the substrate. The release substrates and adhesive elements are united in order to prevent the adhesive elements, such as adhesive labels, adhesive tapes, adhesive floor tiles, or the like, from adhering to each other or to other surfaces from which they cannot be separated without tearing or breaking of the substrate or damage to the adhesive layer. The adhesive element-release substrate unit can be shipped, stored and handled without damage to the sticky adhesive layer, and they can be separated easily and cleanly by the ultimate user to permit the adhesive element to be permanently bonded to another surface.

Release coating compositions are known which are based upon curable organosilicon resins. Most commonly, such known compositions contain volatile organic solvents and are dried and cured by means of heating to elevated temperatures to evaporate the solvents and cure the organosilicon resins.

In order to reduce the cost and pollution inherent in the use of organic solvents, it has been proposed to use liquid vinyl containing organosilicon compositions which require no volatile solvent to form release coatings which are thermally-cured at elevated temperatures (reference is made to U.S. Pat. No. 4,216,252). Such coatings require relatively long dwell times and/or relatively hot ovens in order to produce a satisfactory cure of the release coatings, resulting in a waste of energy and/or a reduction in the line speed of the coating and curing operation.

It is also known to produce liquid vinyl organosilicon release compositions which do not require the presence of volatile organic solvents, and which are curable by means of exposure to radiation in the absence of applied heat. Reference is made to U.S. Pat. No. 4,052,529 which involves the use of siloxanes containing mercapto groups. Such release coatings are highly objectionable because of their bad odor. Moreover, they have slow curing rates and produce release coatings which are not suitable for use with strong adhesives. Reference is also made to U.S. Pat. No. 4,064,027 which relates to similar vinyl siloxane compositions which also have slow curing rates.

Examples of silicone release coatings which overcome the above-described disadvantages can be found in my commonly assigned and co-pending U.S. patent application Ser. Nos. 230,789, filed Feb. 2, 1981 and 230,475 filed Feb. 2, 1981.

SUMMARY OF THE INVENTION

The present invention relates to the discovery of novel liquid vinyl-hydro polysiloxane copolymers and to novel liquid, radiation-curable compositions comprising a polysiloxane copolymer containing the moieties of methylhydro siloxane and methylvinyl siloxane (hereafter, PVHS) and a photosensitizer, which compositions are adapted to be coated in the absence of volatile solvents and cured at high speed under exposure to radiation, such as ultraviolet or electron beam, to form release coatings having excellent release properties even with respect to strong or so-called "aggressive" adhesives.

DESCRIPTION OF THE PREFERRED EMBODIMENTS

The essential novelty of the present invention resides in the novel liquid PVHS copolymers which, unlike prior-known compositions consisting of two different types of polysiloxane resins, provide coating compositions which can be cured rapidly under exposure to radiation to form dry release coatings having excellent release properties even with respect to strong adhesives, as discussed above.

The novel liquid PVHS copolymers of the present invention have the basic structure:

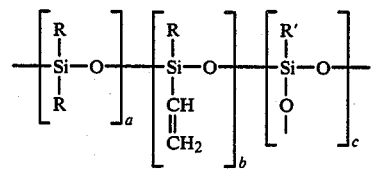

wherein a, b and c are numbers larger than 0. The molar ratio of a to b is selected from a range of about 1 to 99 to 99 to 1, more preferably 0.5 to 1 to 6 to 1; the percent by mole of c to a is selected from a range of about 0.01% to about 10%, more preferably 0.5% to about 5%, (the molar ratio or mole referred to is based upon the molecular weight of the unit and not the molecular weight of the whole copolymer) R's are the same or different monovalent hydrocarbon radicals selected from the group of $C_1$ to $C_4$ alkyl, cyclohexyl and phenyl groups and R' can be an R group or an oxygen radical, i.e., —O—. Optionally, other polysiloxane units known in the art, such as dimethylsiloxane unit can also be incorporated into the inventive copolymer PVHS and used in the practice of this invention. Such PVHS materials may be prepared by reacting known starting materials, such as methylhydrodichlorosilane, vinylmethyldichlorosilane and tetrachlorosilane or trichloromethylsilane or dimethyldichlorosilane and/or trichloromethylsilane in suitable proportions under hydrolysis conditions which result in the evolution of hydrogen chloride. Generally, the formed PVHS is a light syrup (preferably having a controlled viscosity in the range of about 50 to 250 centipoise) and stable, which is suitable for use according to the present invention.

While conventional photosensitizers may be used in the present compositions, the preferred materials are benzoin alkyl ether and benophenone/dimethyl ethanol amine systems. Benzoin methyl ether is the most preferred photosensitizer. Generally, 0.1 to 20%, and most preferably 3–10% by weight of photosensitizer based on the total weight can be used in the formulation in accordance with the present invention.

The following examples illustrate some preferred embodiments of the present invention:

EXAMPLE I 65 gms of vinylmethyldichlorosilane, 66 gms of methyldichlorosilane, 85 gms of dimethyldichlorosilane, 0.67 gms of trichlorosilane, 8.6 gms of trimethylchlorosilane and 100 gms of distilled water are mixed in the order described in a one liter, two necked round bottom flask equipped with a dropping funnel and a condenser which is connected to a gas trap for 30 minutes. The reacted mixture separates into two layers and the bottom layer is discarded. The remaining top layer is washed with a 5% NaHCO₃, 5% NaCl solution until neutral. The sample is then dried over anhydrous MgSO₄ for one hour and filtered.

The resin obtained is a light liquid syrup, marked as Resin I.

Resin II is prepared from the starting materials, 220 gms of methyldichlorosilane, 0.67 gms of trichlorosilane, 8.6 gms of trimethylchlorosilane and 100 gms of distilled water. Thus, Resin II contains the moieties of hydromethylsilicon. Resin III is prepared from the starting materials, 220 gms of vinylmethyl dichlorosilane, 8.6 gms of trimethylchlorosilane and 100 gms of distilled water. Thus, Resin III contains the moieties of vinylmethylsilicon. Resin II and Resin III are prepared in the same manner as that for Resin I as described above.

EXAMPLE II 10 gms of polyvinylhydrosiloxane copolymer produced according to Example 1 are mixed with 0.8 gms of benzoin ether photosensitizer available from Stauffer Chemical Company under the registered trademark "Vi-cure-10". This formulation (hereinafter Formulation I), has the viscosity of light syrup, i.e. 65 centipoises at room temperature which is good for thin coating.

In order to compare the UV sensitivities of the present invention to that known in the art, the following Formulation II is to be used as the control:

| Formulation II | |
|---|---|
| Ingredient | Weight |
| Resin II | 5 gms |
| Resin III | 5 gms |
| Vi-cure-10 | 0.5 gms |

EXAMPLE III

This example illustrates that the instant formulation in accordance with the present invention can be cured by UV light substantially faster than that of conventional formulations known in the art.

One drop each of Formulation I and Formulation II were applied to glass slides separately and then evenly distributed over the surfaces by smearing with a glass rod. The coatings were then exposed to 365 nm UV light under the same condition (2.5 inches below the center point of the UV lamp, Model XX-15, Ultra-Violet Products, Inc. San Carbriel, Calif.). In 30 minutes, the coating in accordance with the present invention, i.e., Formulation I, became cured or dried; whereas the conventional formulation, containing two polysiloxane system, i.e., Formulation II, was not cured; it was still wet.

EXAMPLE IV

A thin layer coating of Formulation I was applied to a paper substrate, followed by curing under UV light as described above. Scotch tape was then pressed against the coated and cured surface of this paper substrate. The cured coating could provide a total release of adhesion of this scotch tape which contains strong adhesive.

Variations and modifications of the present invention will be apparent to those skilled in the art within the scope of the present claims.

I claim:

1. Liquid vinyl-hydro polysiloxane copolymer having the moiety structure:

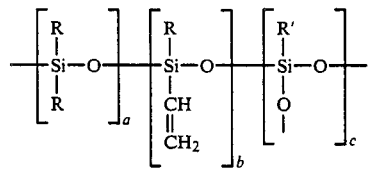

wherein a, b and c are numbers larger than 0: the molar ratio of a to b is selected from a range of about 1 to 99 to 99 to 1, the percent by mole of c to a is selected from a range of about 0.01% to about 10%, R's are the same or different monovalent hydrocarbon radicals selected from the group of $C_1$ to $C_4$ alkyl, cyclohexyl and phenyl groups and R' is an R group or an oxygen radical.

2. A copolymer according to claim 1 in which each R radical is a methyl group, the molar ratio of a to b is selected from a range of about 0.5 to 1 to 6 to 1, and the percent by mole of c to a is selected from a range of from about 0.5% to 5%.

3. A copolymer according to claim 1 or claim 2 having a viscosity between about 50 and 250 centipoise.

4. Radiation curable composition comprising a liquid vinyl-hydro polysiloxane copolymer having the moiety formula:

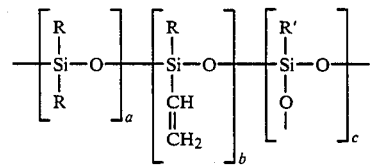

wherein a, b and c are numbers larger than 0: the molar ratio of a to b is selected from a range of about 1 to 99 to 99 to 1, the percent by mole of c to a is selected from a range of about 0.01% to about 10%, R's are the same or different monovalent hydrocarbon radicals selected from the group of $C_1$ to $C_4$ alkyl, cyclohexyl and phenyl groups and R' is an R group or an oxygen radical; and at least one photosensitizer.

5. Composition according to claim 4 in which each R radical is a methyl group, the molar ratio of a to b is selected from a range of about 0.5 to 1 to 6 to 1, and the percent by mole of c to a is selected from a range of from about 0.5% to 5%.

6. Composition according to claim 4 comprising about 90 to 97% by weight of said vinyl-hydro polysiloxane copolymer and from about 3 to about 10 percent by weight of said photosensitizer.

7. Composition according to claim 6 in which said photosensitizer comprises benzoin alkyl ether.

8. Method for producing the liquid vinyl-hydro polysiloxane copolymer of claim 1 comprising the step of reacting a hydromethyl dichlorosilane, a vinyl dichlorosilane, dimethyldichlorosilane, and polychlorosilane under hydrolysis conditions.

9. Method for producing a liquid radiation curable release coating composition comprising mixing from about 90 to 97% weight of a liquid vinyl-hydro polysiloxane copolymer having the moiety structure:

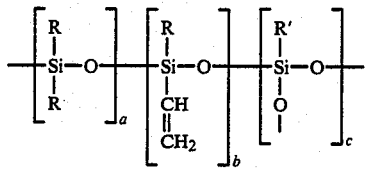

wherein a, b and c are numbers larger than 0: the molar ratio of a to b is selected from a range of about 1 to 99 to 99 to 1, the percent by mole of c to a is selected from a range of about 0.01% to about 10%, R's are the same or different monovalent hydrocarbon radicals selected from the group of $C_1$ to $C_4$ alkyl, cyclohexyl and phenyl groups and R' is an R group or an oxygen radical; and from about 3% to 10% by weight of at least one photosensitizer.

10. Method according to claim 9 in which said vinyl-hydro polysiloxane copolymer has the basic structure:

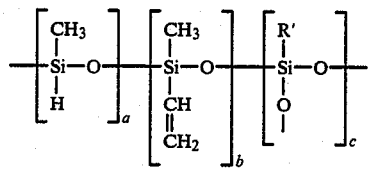

wherein the molar ratio of a to b is selected from a range of about 0.5 to 1 to 6 to 1, and the percent by mole of c to a is selected from a range of from about 0.5% to 5%.

11. Composition according to claim 6 in which said photosensitizer comprises benzoin methyl ether.

* * * * *